Dec. 31, 1963  A. H. NITZ  3,115,799
ADJUSTABLE TOOLHOLDER
Filed Nov. 28, 1960
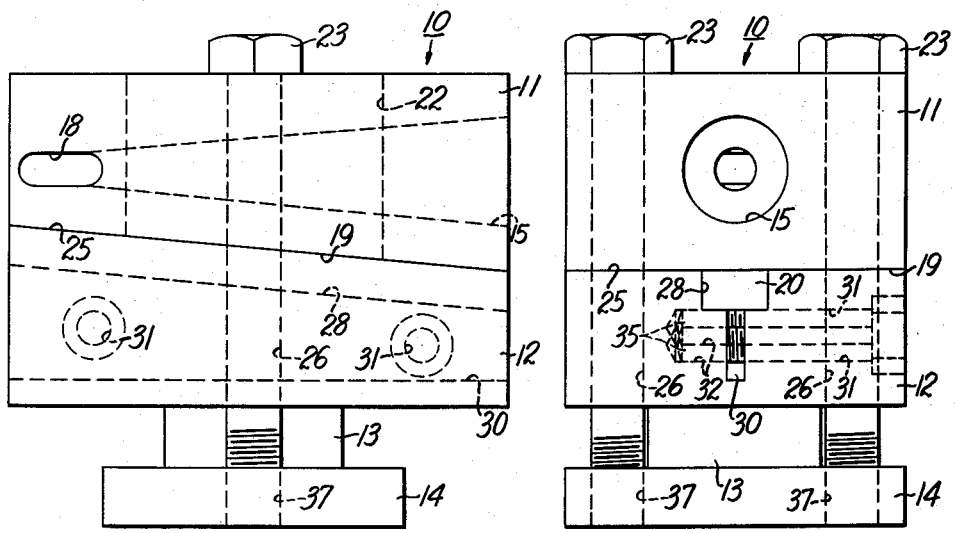
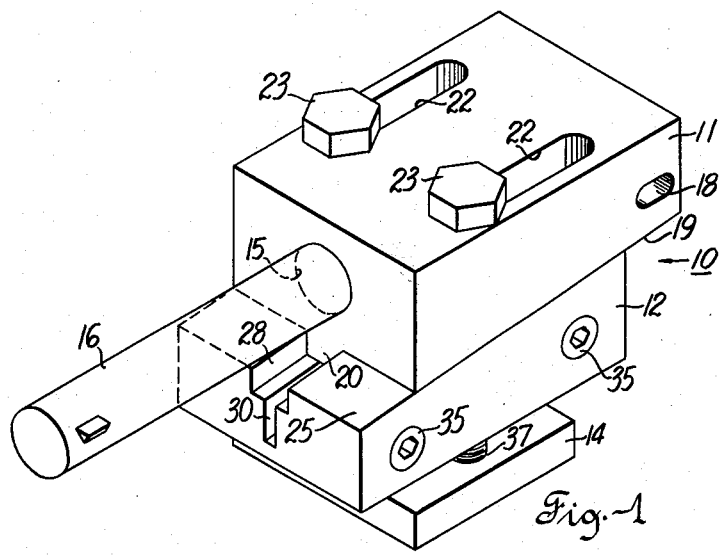
Inventor
Albert H. Nitz
By Robert C. Benson
Attorney

3,115,799
ADJUSTABLE TOOLHOLDER
Albert H. Nitz, 9132 W. Bluemound Road, Milwaukee, Wis., assignor of one-fourth to Tolvin S. Ulsrud
Filed Nov. 28, 1960, Ser. No. 72,247
6 Claims. (Cl. 82—36)

This invention relates generally to lathe adaptors. More specifically this invention relates to adjustable toolholders for lathes.

A toolholder of this type is mounted in movable tool carriage such as the compound of a lathe. In this way the toolholder can be moved both longitudinally and transversely to the work piece. In addition, the toolholder is divided into a pair of parts movable relative to each other to vary the height of the tool mounted in one of the pair of parts.

In the past it has often been difficult to vary the height of the tool in the toolholder because the movable parts of the toolholder tended to stick together after having been tightly clamped together to hold them in the adjusted position. Also it has been difficult with some toolholders to maintain them in their adjusted position especially when taking heavy cuts.

The toolholder of this invention overcomes the problems mentioned above by providing a toolholder that is divided generally along an inclined plane into two relatively movable blocks. One block has a projection that extends from the inclined surface and fits loosely into a groove formed in the inclined surface of the second block. The complementary blocks of the toolholder are clamped together vertically and horizontally. The vertical clamp forces the inclined surfaces of the blocks together and the horizontal clamp forces the sides of the grooved portion of the second block against the projection on the first block. The two sets of clamps provide a greater clamping force on the two parts of the toolholder but less force on the mating inclined sliding surfaces of the blocks. Hence the toolholder of this invention provides an adjustable toolholder that has greater clamping force and is easier to adjust.

Therefore it is the object of this invention to provide a new and improved toolholder for lathes.

Another object of this invention is to provide a new and improved adjustable toolholder for lathes that is easier to adjust.

Another object of this invention is to provide a new and improved adjustable toolholder for lathes that can be more securely clamped in position without impairing its adjustability.

Other objects and advantages of this invention will be apparent from the following description when read in connection with the accompanying drawings, in which:

FIG. 1 is a pictorial view of the toolholder of this invention with boring bar mounted therein;

FIG. 2 is a side view of the toolholder of FIG. 1 without the boring bar;

FIG. 3 is an end view of the toolholder of FIG. 2.

Referring more specifically to the drawings by characters of reference, the toolholder 10 comprises an upper block 11 and lower block 12 mounted on a spacer 13 and a head 14 which is designed to fit into a complementary groove of a lathe compound or the like.

The upper block 11 is provided with a tapered bore 15 for receiving a suitable cutting tool such as a boring bar 16 or the shank of a small motor. By providing means in the upper block for holding a motor you greatly increase the number of cutting operations that can be made from the toolholder. A slot 18 is provided at the small end of the tapered bore for ease in releasing the cutting bar or shank of the cutting tool. The lower surface 19 of the block 11 is inclined and has a projection 20 extending therefrom. The projection 20 is substantially rectangular in cross section and runs the entire length of the block 11. The lower surface of the projection 20 is inclined at the same angle as the surfacing of block 11. Furthermore, the upper block has two spaced apart longitudinally extending slots 22 spaced on either side of the tapered bore 15. The slots 22 are designed to receive a pair of bolts 23 that are used to clamp the blocks 11, 12 together. The slots are provided to allow the upper block to slide longitudinally relative to the bolts and the lower block 12 as will be explained in detail later.

The lower block 12 has a surface 25 that is inclined complementary to the inclined surface 19 of the upper block 11. The lower block 12 also has a pair of holes 26 that are aligned with the slots 22 of the upper block. A groove 28 for receiving the projection 20 is formed in the inclined surface 25. This groove is positioned between the holes 26 and extends the entire length of the block. The size of the groove is slightly greater than that of the projection to allow for a free sliding fit. A narrow slot 30 is provided in the lower block 12 that extends downward from the bottom surface of the groove 28. A pair of holes 31 are drilled in one side of the block 12 and extend partially into the portion of the block on the other side of the slot 30. The portion 32 of the holes on the other side of the slot is threaded to receive an appropriate screw 35. When the upper block 11 is positioned over the lower block 12 with the projection 20 in groove 28, the screws 35 are tightened in the portion 31 to force the sides of the groove toward the side of the projection to grip the projection and prevent relative movement between the blocks.

The head member 14 is designed to fit into a tool carriage such as a lathe compound for supporting the toolholder. The head 14 has two threaded holes 37 that receive the ends of bolts 23. These bolts 23 extend through slots 22 in the upper block 11, the holes 26 in the lower block 12, and threadedly engage the holes 37 in the head 14. These bolts serve to clamp the upper and lower blocks together along the complementary inclined surfaces 19, 25.

The spacer 13 is provided to separate the lower block 12 from the head 14. The spacer 13 is very important if the support member is to be positioned in a T shaped slot such as in a lathe compound.

In operation the upper block 11 is positioned in the lower block 12 with the projection 20 positioned in the groove 28. The spacer 13 is positioned between the lower block 12 and head 14. Then the bolts 23 are inserted through the grooves 22 and holes 26, and engage the threaded holes 37. The toolholder unit is then mounted in a lathe compound by positioning the support member in the compound slot. The desired height of the tool in the toolholder is then obtained by moving the upper block 11 relative to the lower block 12. When the desired height is obtained the bolts 23 are tightened. Then the screws 35 are inserted through holes 31 into threaded portions 32 and are tightened therein. This causes the lower block to firmly grip the projection. The bolts 23 and screws 35 provide a dual gripping effect on the toolholder and prevent accidental displacement of the blocks 11, 12 and hence the cutting of the tool even under extremely heavy loads.

Although but one embodiment has been illustrated and described, it will be apparent to those skilled in the art that various changes and modifications can be made in the described apparatus without departing from the spirit of the invention or the scope of the appended claims.

It is claimed and desired to secure by Letters Patent:

1. A toolholder adapted to be mounted in a lathe compound comprising: a first block, one surface of said first block being inclined, said first block having means for carrying a cutting tool, a projection extending from said inclined surface, a second block positioned adjacent said first block and having one surface inclined complementary to said inclined surface of said first block, said inclined surface of said second block having a groove defined therein for receiving said projection and a slot extending inward from the bottom of said groove, said first block being movable relative to said second block to vary the position of said cutting tool, first clamping means forcing said inclined surfaces together and second clamping means acting transverse to said first clamping means for forcing the groove defining surfaces of said second block to grip said projection.

2. A toolholder adapted to be mounted in a lathe compound comprising: a first block, one surface of said first block being inclined, said first block having means for carrying a cutting tool, a substantially rectangular projection extending the length of said inclined surface, a second block positioned adjacent said first block and having one surface inclined complementary to said inclined surface of said first block, said inclined surface of said second block having a groove defined therein for receiving said projection and a slot extending inward from the bottom of said groove, said first block being movable relative to said second block to vary the position of said cutting tool, first clamping means forcing said inclined surfaces together and second clamping means acting transverse to said first clamping means for forcing the groove defining surfaces of said second block to grip said projection.

3. A toolholder adapted to be mounted in a lathe compound comprising: a first block, one surface of said first block being inclined, said first block having means for carrying a cutting tool, a projection extending the length of said inclined surface, a second block positioned adjacent said first block and having one surface inclined complementary to said inclined surface of said first block, said inclined surface of said second block having a groove defined therein for receiving said projection and a slot extending inward from the bottom of said groove, said first block being movable relative to said second block to vary the position of said cutting tool, a head member spaced from said second block for mounting the toolholder in a lathe compound, a pair of spaced apart threaded holes in said head, bolts extending through said blocks and threadedly engaging the holes in said head for forcing said inclined surfaces together, and second clamping means acting transverse to said bolts for forcing the groove defining surfaces of said second block to grip said projection.

4. A toolholder adapted to be mounted in a lathe compound comprising: a first block, one surface of said first block being inclined, said first block having means for carrying a cutting tool, a projection extending the length of said inclined surface, a second block positioned adjacent said first block and having one surface inclined complementary to said inclined surface of said first block, said inclined surface of said second block having a groove defined therein for receiving said projection and a slot extending inward from the bottom of said groove, said first block being movable relative to said second block to vary the position of said cutting tool, a head member spaced from said second block for mounting the toolholder in a lathe compound, a pair of spaced apart threaded holes in said head, a spacer positioned between said second block and said head, bolts extending through said blocks and threadedly engaging the holes in said head for forcing said inclined surfaces together, and clamping means acting transverse to said bolts for forcing the groove defining surfaces of said second block to grip said projection.

5. A toolholder adapted to be mounted in a lathe compound comprising: a first block; one surface of said first block being inclined; said first block having means for carrying a cutting tool; a projection extending the length of said inclined surface; said first block having a pair of longitudinally extending slots positioned on either side of said projection; a second block positioned adjacent said first block and having one surface inclined complementary to said inclined surface of said first block; said inclined surface of said second block having a groove defined therein for receiving said projection, and a slot extending inward from the bottom of said groove; said first block being movable relative to said second block to vary the position of said cutting tool; a head member spaced from said second block for mounting the toolholder in a lathe compound; a pair of spaced apart threaded holes in said head; a spacer positioned between said second block and said head; bolts extending through the slots in said first block, said second block, and threadedly engaging the holes in said head for forcing said inclined surfaces together; and second clamping means acting transverse to said bolts for forcing the groove defining surfaces of said second block to grip said projection.

6. A toolholder adapted to be mounted in a lathe compound comprising: a first block; one surface of said first block being inclined; said first block having means for carrying a cutting tool; a projection extending the length of said inclined surface; said first block having a pair of longitudinally extending slots positioned on either side of said projection; a second block positioned adjacent said first block and having one surface inclined complementary to said inclined surface of said first block; said inclined surface of said second block having a groove defined therein for receiving said projection, a slot extending inward from the bottom of said groove, and a pair of apertures aligned with said slots in said first block; said first block being movable relative to said second block to vary the position of said cutting tool; a head member spaced from said second block for mounting the toolholder in a lathe compound; a pair of spaced apart threaded holes in said head; a spacer positioned between said second block and said head; said second block having transverse holes extending from one side past said slot into the other side of said block; the portion of said hole in said other side being threaded; and screws extending through said holes in said one side of said second block and operatively engaging said threaded portion to force said second block to clamp said projection; bolts extending through the slots in said first block, said apertures in said second block, and threadedly engaging the holes in said head for forcing said inclined surfaces together.

References Cited in the file of this patent
UNITED STATES PATENTS

| | | | |
|---|---|---|---|
| 536,845 | Worsley | Apr. 2, | 1895 |
| 902,169 | Richards | Oct. 27, | 1908 |
| 1,040,774 | Schamel | Oct. 8, | 1912 |
| 1,327,356 | Putnam | Jan. 6, | 1920 |
| 1,647,590 | Tiefenbacher | Nov. 1, | 1927 |
| 1,959,140 | Peterson | May 15, | 1934 |
| 2,035,999 | Tiefenbacher | Mar. 31, | 1936 |
| 2,188,917 | Poorman | Feb. 6, | 1940 |

FOREIGN PATENTS

| | | | |
|---|---|---|---|
| 25,382 | Great Britain | Nov. 6, | 1913 |